(12) United States Patent
Verschueren et al.

(10) Patent No.: US 10,546,686 B2
(45) Date of Patent: Jan. 28, 2020

(54) ANTENNA SYSTEM FOR NEAR-FIELD MAGNETIC INDUCTION WIRELESS COMMUNICATIONS

(71) Applicant: NXP B.V., Eindhoven (NL)

(72) Inventors: Pieter Verschueren, Langdorp (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 358 days.

(21) Appl. No.: 15/069,182

(22) Filed: Mar. 14, 2016

(65) Prior Publication Data

US 2017/0263376 A1 Sep. 14, 2017

(51) Int. Cl.
| | |
|---|---|
| *H01F 38/14* | (2006.01) |
| *H01Q 7/08* | (2006.01) |
| *H04B 5/00* | (2006.01) |
| *H01F 27/32* | (2006.01) |
| *H01Q 1/44* | (2006.01) |
| *H01Q 7/00* | (2006.01) |

(Continued)

(52) U.S. Cl.
CPC ......... *H01F 38/14* (2013.01); *H01F 27/2823* (2013.01); *H01F 27/325* (2013.01); *H01Q 1/273* (2013.01); *H01Q 1/44* (2013.01); *H01Q 7/005* (2013.01); *H01Q 7/08* (2013.01); *H04B 5/0037* (2013.01); *H01F 2038/143* (2013.01); *H04R 2225/51* (2013.01)

(58) Field of Classification Search
CPC ........ H01F 38/14; H01Q 7/08; H04B 5/0037; H04R 3/00; H04R 2420/07; H02J 50/10
See application file for complete search history.

(56) References Cited

U.S. PATENT DOCUMENTS 3,019,335 A * 1/1962 Brilliant ............... H03G 11/002
                                                              333/175
8,532,568 B2   9/2013 Kerselaers
(Continued)

FOREIGN PATENT DOCUMENTS

EP      2 858 175 A1   4/2015
JP     363180223 A *   7/1988 ............. C04B 35/26
(Continued)

OTHER PUBLICATIONS

U.S. Appl. No. 15/437,551; not yet published; 27 pages (filed Feb. 21, 2017).
(Continued)

*Primary Examiner* — Graham P Smith
*Assistant Examiner* — Jae K Kim
(74) *Attorney, Agent, or Firm* — Daniel D. Hill

(57) ABSTRACT

An antenna system is provided that is capable of transmitting and receiving using near-field magnetic induction (NFMI). The antenna system includes a non-magnetic metallic core, a ferrite shield, and at least one electrically conducting winding. The ferrite shield is positioned between the non-magnetic metallic core and the electrically conducting winding. The non-magnetic metallic core may be a battery. The ferrite material forms a low impedance path for the magnetic field lines and increases inductance, thus providing increased energy efficiency and transmission quality. The antenna system is suitable for use in space constrained battery powered devices, such as hear instruments including hearing aids and earbuds.

20 Claims, 3 Drawing Sheets

(51) Int. Cl.
*H01F 27/28* (2006.01)
*H01Q 1/27* (2006.01)

(56) References Cited

U.S. PATENT DOCUMENTS

| | | | |
|---|---|---|---|
| 8,724,835 B2 | 5/2014 | Kerselaers et al. | |
| 9,197,986 B1 | 11/2015 | Kerselaers et al. | |
| 2009/0189565 A1 | 7/2009 | Cheng et al. | |
| 2011/0275421 A1 | 11/2011 | Wong et al. | |
| 2012/0282587 A1 | 11/2012 | Zhang | |
| 2012/0282857 A1 | 11/2012 | Zhang | |
| 2014/0177863 A1 | 6/2014 | Parkins | |
| 2014/0184462 A1 | 7/2014 | Yosui | |
| 2015/0116090 A1 | 4/2015 | Proehl | |
| 2015/0318932 A1 | 11/2015 | Kerselaers et al. | |
| 2015/0319545 A1 | 11/2015 | Kerselaers et al. | |
| 2016/0072558 A1* | 3/2016 | Hirsch | H04B 5/0081 455/41.1 |
| 2017/0028166 A1 | 2/2017 | Walpole et al. | |
| 2017/0062949 A1 | 3/2017 | Kerselaers et al. | |
| 2017/0125883 A1 | 5/2017 | Tenno | |
| 2017/0202467 A1* | 7/2017 | Zitnik | A61B 5/04001 |
| 2017/0324170 A1 | 11/2017 | Kerselaers et al. | |

FOREIGN PATENT DOCUMENTS

| | | | | |
|---|---|---|---|---|
| JP | WO 2015064693 A1 * | 5/2015 | | C04B 35/26 |
| WO | PCT/GB2015/051102 | * 10/2015 | | A61M 21/02 |
| WO | WO-2015/164010 A1 | 10/2015 | | |

OTHER PUBLICATIONS

Non-Final Office Action dated Jan. 25, 2018 for U.S. Appl. No. 15/437,551, 38 Pages.

Related Case: U.S. Appl. No. 15/437,551 Notice of Allowance; 10 pages; dated May 3, 2019.

* cited by examiner

ANTENNA SYSTEM FOR NEAR-FIELD MAGNETIC INDUCTION WIRELESS COMMUNICATIONS

BACKGROUND

Field

This disclosure relates generally to communications and more specifically to an antenna system for near-field magnetic induction wireless communications.

Related Art

Near-field magnetic induction (NFMI) wireless communication utilizes non-propagating quasi-static fields. The quasi-static characteristic of the field is the result of antenna dimensions in combination with the carrier frequency. The majority of the energy is stored in the form of magnetic and electric fields and a small amount of radio frequency (RF) energy propagates in free space. Because NFMI does not depend on generating radiating waves in free space, small antenna geometries compared with the carrier wavelength can be used. The antenna can be a coil antenna that allows NFMI.

Implementation in small applications like earbuds or smart watches require very small antenna constructions that reduce the robustness of the wireless communication link between transmitter and receiver. Therefore, a need exists for a NFMI antenna that can be integrated in very small wireless products near to the human body and that will provide good reliability for wireless communication while also being energy efficient.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
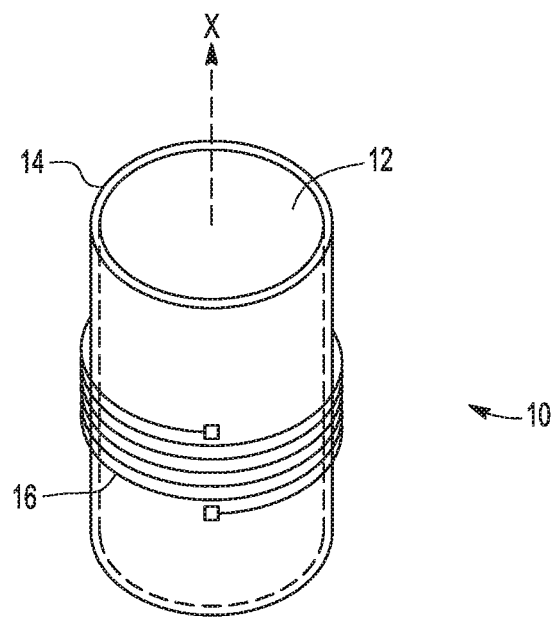
FIG. 1 illustrates an antenna system in accordance with an embodiment.

Generally, there is provided, an antenna system that is capable of transmitting and receiving electrical energy using near-field magnetic induction. The antenna system includes a non-magnetic metallic core, a ferrite shield, and at least one electrically conducting winding. The ferrite shield is positioned between the non-magnetic metallic core and the electrically conducting winding. The non-magnetic metallic core may be a battery. The ferrite material forms a low impedance path for the magnetic field lines and increases inductance, thus improving energy efficiency and transmission quality. The antenna system is suitable for use in space constrained battery powered devices, such as hear instruments including hearing aids and earbuds.

In one embodiment, there is provided, an antenna system comprising: a non-magnetic metallic core; a ferrite material covering at least a portion of the non-magnetic metallic core; and an electrical conductor disposed around the non-magnetic metallic core and ferrite material. The non-magnetic metallic core may be a battery. The non-magnetic metallic core may be cylindrical shaped and the ferrite material may cover only a side of the non-magnetic metallic core. The ferrite material may comprise a ferrite sheet. The ferrite sheet may include an adhesive on one side for adhering to the non-magnetic metallic core. The ferrite material may be applied as a coating comprising ferrite particles in suspension. The antenna may be for communicating electrical energy using near-field magnetic induction. A carrier frequency for communicating the signals may be about 10.6 Mega Hertz (MHz). The electrical conductor may be formed using an insulated copper wire. The electrical conductor may be a conductive trace on a flexible printed circuit board.

In another embodiment, there is provided, an antenna for use in a near-field magnetic induction communication system, the antenna comprising: a ferrite material covering at least a portion of a battery, the battery being used for powering at least a portion of the communication system; and an electrical conductor disposed around the battery and ferrite material in a predetermined number of loops. The ferrite material may comprise a ferrite sheet. The communication system may provide wireless signal transmission between the earbuds of a pair of earbuds. The ferrite material may comprise a sheet of ferrite material. The ferrite sheet may include an adhesive on one side for adhering to the non-magnetic metallic core. The carrier frequency for communication system may be about 10.6 MHz.

In yet another embodiment, there is provided, an antenna for use in a battery powered near-field magnetic induction wireless communication system, the antenna comprising: a magnetic material covering at least a portion of a battery, the battery being used for powering at least a portion of the communication system; and an electrical conductor disposed around the battery and ferrite material in a predetermined number of loops. The battery may be cylindrical shaped having a curved side and two ends, the magnetic material only covering the side of the battery. In other embodiments, the battery may have a different shape, e.g. rectangular. The shape of the battery is not importance for the effectiveness of the antenna, the surface area. The magnetic material comprises a ferrite. The communication system may provide wireless signal transmission between the earbuds of a pair of earbuds. The carrier frequency for the wireless signal transmission may be about 10.6 MHz.

FIG. 1 illustrates antenna system 10 for communicating electrical energy in accordance with an embodiment. Antenna system 10 includes a ferrite material 14 formed in a sheet and wrapped around a non-magnetic metallic core 12. In the illustrated embodiment, non-magnetic metallic core 12 is a battery that is cylindrical shaped having a curved side and two ends. The magnetic material 14 may be a sheet of material covering only the side of the battery and not the ends. Non-magnetic metallic core 12 may be a battery for powering a device using the antenna system. An electrical conductor 16 is disposed in a spiral around the non-magnetic metallic core 12 and ferrite material 14 in a predetermined number of turns. In one embodiment wire 16 is insulated copper that is spiral wound in multiple turns around an x-axis illustrated in FIG. 1. In another embodiment, the electrical conductor may be a conductive trace on a flexible substrate such as a flexible printed circuit board (PCB). In one embodiment, the PCB may include a series of parallel conductive traces, that when wrapped around ferrite shield 14, the ends of the traces contact each other to form a single coil. Antenna system 10 is intended for operation in NFMI communication systems having carrier frequencies between about 3 and 30 Mega Hertz (MHz). In one embodiment, the carrier frequency is about 10.6 MHz.

In space constrained battery powered devices, the battery typically is the largest component. A typical NFMI antenna includes a ferrite rod with spiral wound copper wire around it. Alternately, the antenna may have an air core, or may have a non-magnetic metallic core that is different than a battery. However, the diameter and surface of the air core antenna has to be larger than an antenna with a ferrite rod due to lack of magnetic material in the air core. Because of the small size of the battery powered devices, it is necessary to position the air core antenna close to metallic parts (such as a coin cell battery), which will reduce the quality factor (Q) of the antenna due to the eddy currents created inside the metal. Both the self-resonance frequency and quality factor of the antenna can be lowered to such a level that the communication distance is reduced too much or even that communication becomes impossible for a chosen application. Putting a magnetic shield around the non-magnetic metallic core as illustrated in FIG. 1 reduces the impact of the presence of metal very close to the antenna wire coil 16. Flexible ferrite sheets suitable for this application are commercially available. The ferrite sheet may also include an adhesive on one side for adhering to non-magnetic metallic core 12. Also, the ferrite sheets may include a protective layer on the other side. Wrapping a shield around the battery and the wire coil around both provides an NFMI antenna 10 with a large diameter and surface area, hence large sensitivity while adding only a little volume. Also, the battery provides a mechanical holder for the windings of the inductor and makes it easier and more predictable to consistently produce antenna 10 if the battery is used as a guide for creating the antenna loops in antenna 10. In another embodiment, ferrite shield 14 is applied as a coating comprising ferrite particles in suspension and may be applied similarly as a paint or other liquid coating. Note that FIG. 1 is not drawn to scale and a cylindrical shaped battery may different dimensions, such as having a diameter much larger than its length. Also, the battery may have a different shape, such as rectangular.

Figure 2:
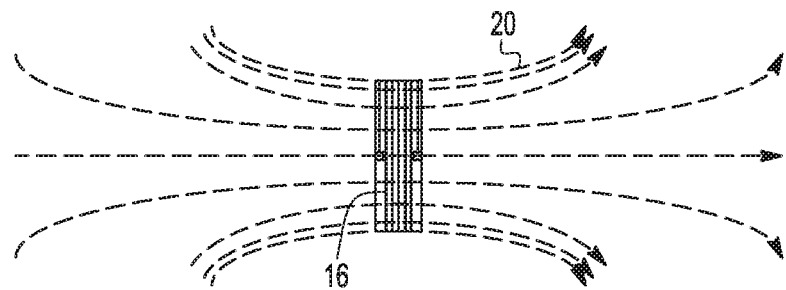
FIG. 2 illustrates approximate magnetic field distribution of a coil antenna with an air core and without a ferrite shield.
Figure 3:
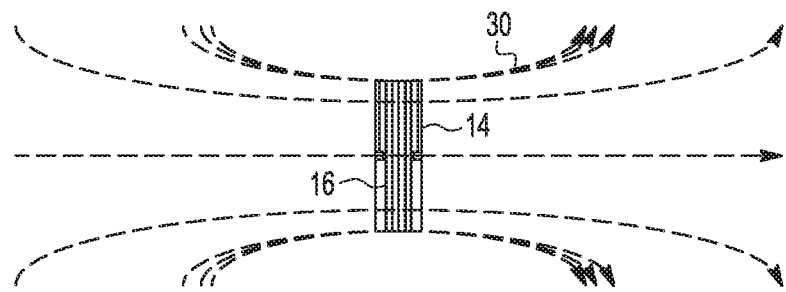
FIG. 3 illustrates approximate magnetic field distribution of a coil antenna with non-ferromagnetic metallic core with a ferrite shield.

FIGS. 2 and 3 provide a comparison of the magnetic field distribution of antennas having an air core not coated with a ferrite material (FIG. 2) and a non-magnetic metallic core coated with a ferrite material (FIG. 3). In FIG. 2 the approximate magnetic field distribution of a coil antenna with an air core without a ferrite shield is fairly equally distributed through the cross-section of coil 16. In FIG. 3 the approximate magnetic field distribution of the coil antenna with non-ferromagnetic metallic core with a ferrite shield is concentrated in the magnetic shield 14 as compared to the antenna illustrated in FIG. 2. Reducing the magnetic field through the battery 12 will reduce eddy currents created in the top and bottom of the battery surface, perpendicular to the magnetic field, reducing the impact on the quality factor Q.

Figure 4:
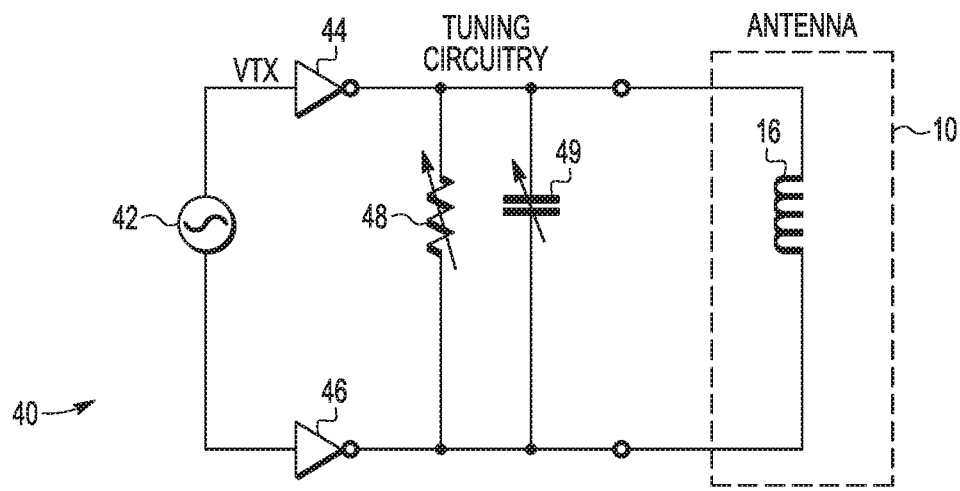
FIG. 4 illustrates, in schematic diagram form, a transmitter circuit using the antenna system of FIG. 1 in accordance with an embodiment.

FIG. 4 illustrates, in schematic diagram form, transmitter circuit 40 using antenna system 10 of FIG. 1 in accordance with an embodiment. Transmitter circuit 40 may be one form of transmitter circuit used in, for example, an earbud for transmitting an NFMI signal to a receiver circuit, such as receiver circuit 50, in another earbud. Transmitter circuit 40 includes amplifiers 44 and 46 coupled to a signal source 42 for receiving a signal labeled "VTX" for transmission using antenna system 10. Signal source 42 may be a radio signal modulated by an audio signal produced by, for example, an MP3 player. A tuning circuit comprises a variable resistance 48 and a variable capacitance 49 connected together in parallel between the output terminals of amplifiers 44 and 46. Antenna system 10 is connected to the parallel connection of variable resistance 48 and variable capacitance 49 and the output terminals of amplifiers 44 and 46.

Antenna system 10 is tuned to resonance at a predetermined carrier frequency by tuning variable capacitance 49 and variable resistance 48. In one embodiment, the variable capacitance includes a switchable bank of capacitors that can be integrated into an integrated circuit. To allow communication with sufficient data rate the antenna circuit should have sufficient bandwidth. To meet the bandwidth requirement of transmitter circuit 40, variable resistance 48 is tuned. Voltage source 42 forces a current through the coil of antenna 16. When a current in the antenna coil is flowing, a magnetic field is generated around the coil according to Ampere's right hand rule. The generated magnetic field has a linear relationship with the current through the coil. For a cylindrical coil shape the magnetic field strength H in the NFMI area can be found by $H=\mu_{rod}INr^2/2(r^2+x^2)^{3/2}$, where $\mu_{rod}$ is the amplification factor depending on the ferrite material, I is the current in the coil, N is the number of turns of the coil, r is the radius of the coil and x is the distance from the coil along the x-axis as illustrated in FIG. 1.

Figure 5:
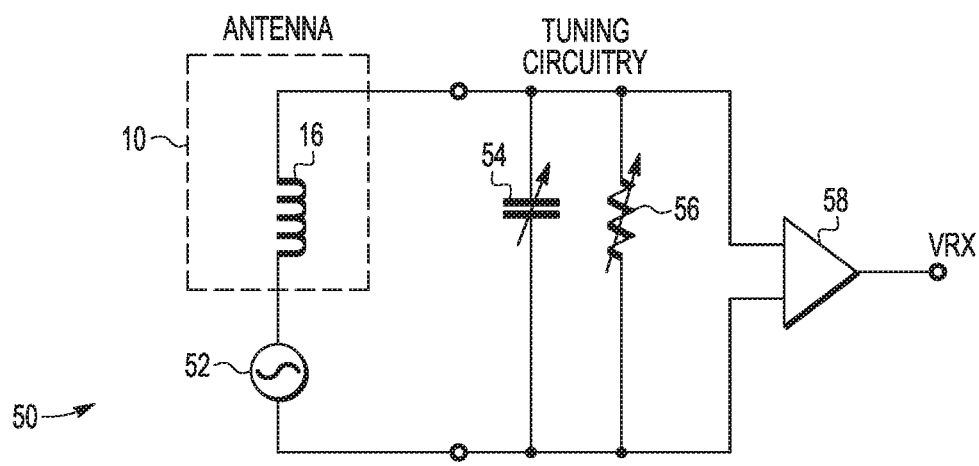
FIG. 5 illustrates, in schematic diagram form, a receiver circuit using the antenna system of FIG. 1 in accordance with an embodiment.

FIG. 5 illustrates, in schematic diagram form, receiver circuit 50 using antenna system 10 of FIG. 1 in accordance with an embodiment. Receiver circuit 50 may be one form of receiver circuit used in, for example, an earbud for receiving an NFMI signal. Receiver circuit 50 includes a tuning circuit comprising variable capacitance 54 and variable resistance 56 both connected in parallel between the antenna terminals. A low noise amplifier (LNA) 58 has first and second input terminals connected to each end of the parallel connection of variable capacitance 54 and variable resistance 56 for receiving an input voltage through the tuning circuit. Signal source 52 is representative of a signal received at antenna system 10. Low noise amplifier 58 provides a signal labeled VRX to other circuitry for processing the received signal to provide, for example, audio at a speaker. In one embodiment, an NFMI signal can be reliably transmitted from transmitter 40 to receiver 50 at a distance of about 20 to 25 cm. The antennas provide the strongest signal when they are oriented lengthwise in the x-axis with respect to each other.

When antenna coil 16 of receiver circuit 50 receives a signal from, for example, transmitter circuit 40, the magnetic field from the antenna coil of transmitter circuit 40 induces a voltage in the antenna coil of receiver circuit 50. The receiver circuit is resonance tuned similar to the tuning of transmitter circuit 40. The induced voltage will be multiplied by a quality factor of the receiver resonance circuit at the input of low noise amplifier 58. An induced voltage $V_{induced}$ in the receiver circuit antenna coil is $V_{induced}=2N\pi FSH\mu\mu eff$, where F is the carrier frequency, N is the number of antenna coil turns, S is the surface area of the formed by the coil circumference, H is the magnetic field strength at the receiver coil and $\mu$ is the magnetic permeability in a vacuum, $\mu eff$ is the effective permeability of the ferrite material. The induced voltage is multiplied by the quality factor of the resonance circuit at the input of amplifier 58. In one example, antenna system 10 has a ferrite core shield 14 being 2 mm in diameter and 6 mm in length with an inductance of 3.8 µH. The antenna circuit is tuned at 10.6 MHz carrier frequency with a bandwidth of 450 KHz. When a voltage of 1.5 µV is induced in the antenna coil 16 of receiver circuit 50, the voltage at the input of amplifier 58 becomes 39 µV for an antenna with a quality factor of 26.

In a transceiver system, receiver circuit 50 may be selectively coupled to the same antenna system 10 as transmitter circuit 40.

Figure 6:
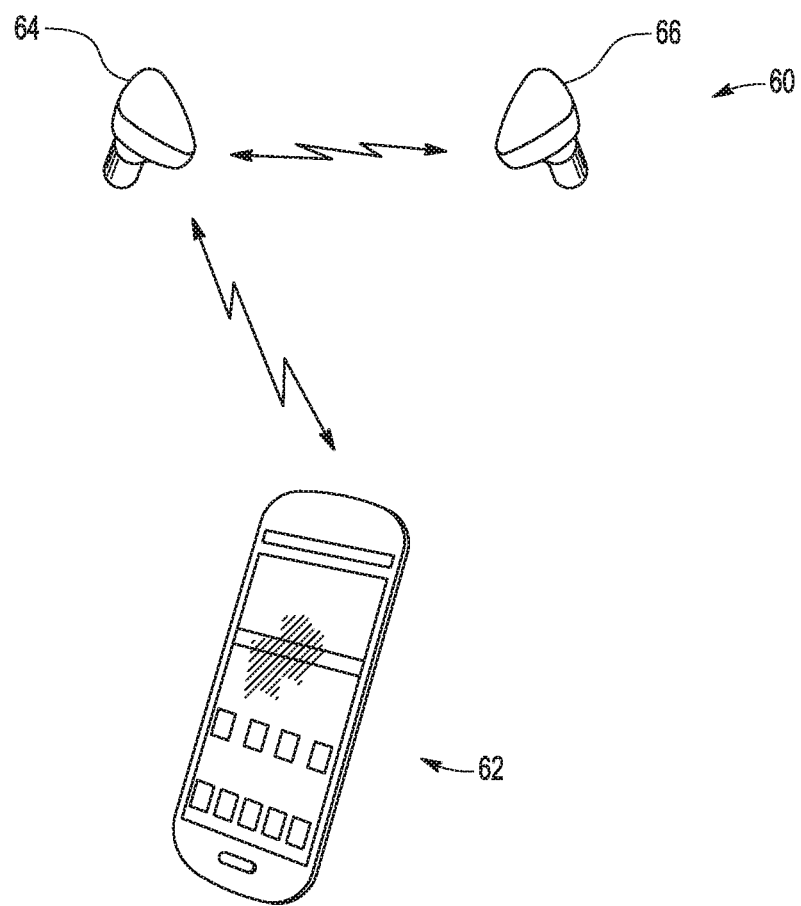
FIG. 6 illustrates a pair of earbuds in communication with a mobile device in accordance with an embodiment.

FIG. 6 illustrates a pair of earbuds 60 in communication with a mobile device 62 in accordance with an embodiment. The pair of earbuds 60 includes a left earbud 64 and a right earbud 66. Mobile device 62 may be a mobile phone, computer, MP3 player, etc. In the illustrated embodiment, mobile device 62 is in wireless communication with left earbud 64 with, for example, a commonly used communication standard such as IEEE 802.15.1 also known as Bluetooth. Sending a stereo audio stream to two distinct earbuds is not possible using conventional Bluetooth due to human body shadowing and radio signal absorption. Forwarding a quality audio stream from one earbud to the other is difficult using 2.4 GHz electromagnetic waves because the human body tissue absorbs much of the signal. Using NFMI as implemented in the present invention has been found to work reliably close to the human body. In one embodiment, a transmitter such as transmitter 40 is located in left earbud 64 and a receiver such as receiver 50 is located in right earbud 66. In another embodiment, transceivers may be located in both earbuds 64 and 66 to allow bi-directional communication between the earbuds, and to allow bi-directional communication between the earbuds and the mobile device. Antenna system 10 can also be integrated into other very small wireless products for use near the human body and provides low power consumption. Examples of potential uses include behind-the-ear hearing aids, in-ear hearing aids, in-ear-canal hearing aids, earbuds, smart watches, wireless battery charging, etc.

Putting the antenna coil around the battery with a ferrite shield reduces the amount of space in a wireless product for including a battery and an antenna. The ferrite material in ferrite shield 14 (FIG. 1) forms a low impedance path for the magnetic field lines and increases inductance, thus increasing signal quality.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A transmitter and a receiver for use in a near-field magnetic induction communication system, the transmitter comprising:
   a first battery;
   a first ferrite material covering at least a portion of the first battery;
   a transmitter antenna comprising an electrical conductor looped around the first battery and the first ferrite material; and
   a transmitter tuning circuit comprising a signal source, first and second amplifiers, a first variable tuning capacitor and a first variable resistance, the first and second amplifiers each having an input coupled to the signal source, an output of the first amplifier coupled to a first end of the electrical conductor and an output of the second amplifier coupled to a second end of the electrical conductor, the first variable tuning capacitor and the first variable resistance coupled together in parallel between the first and second ends of the electrical conductor, the first variable tuning capacitor for maintaining the looped electrical conductor in resonance, and the first variable resistance for maintaining a bandwidth of the looped electrical conductor, and
   the receiver comprising:
   a second battery;
   a second ferrite material covering at least a portion of the second battery;
   a receiver antenna comprising an electrical conductor looped around the second battery and the second ferrite material; and
   a receiver tuning circuit comprising a third amplifier, a second variable tuning capacitor, and a second variable resistance, the second variable tuning capacitor and the second variable resistance coupled together in parallel between first and second ends of the electrical conductor of the receiver antenna, the third amplifier having first and second inputs coupled to the first and second ends, respectively, of the electrical conductor of the receiver antenna,
   wherein neither of the first end or the second end of the electrical conductors of the transmitter and receiver antennas are connected to a reference voltage, and wherein during a signal transmission from the transmitter to the receiver, the looped electrical conductor of the transmitter is oriented so that an open end of the looped electrical conductor is directed toward an open end of the looped electrical conductor of the receiver and along the same axis.

2. The transmitter and receiver of claim 1, wherein the transmitter is located in a first earbud of a pair of earbuds and the receiver is located in a second earbud of the pair of earbuds, and during the signal transmission, the first and second earbuds are positioned in first and second human ears, respectively.

3. The transmitter and receiver of claim 1, wherein the first and second batteries is cylindrical and the first and second ferrite material covers only a side of the first and second batteries.

4. The transmitter and receiver of claim 1, wherein the first and second ferrite material each comprises a ferrite sheet.

5. The transmitter and receiver of claim 4, wherein the ferrite sheet includes an adhesive on one side for adhering to the first battery.

6. The transmitter and receiver of claim 1, wherein the first and second ferrite material is applied as a coating comprising ferrite particles in suspension.

7. The transmitter and receiver of claim 1, wherein a carrier frequency for communicating the signals is 10.6 Mega Hertz (MHz).

8. The transmitter and receiver of claim 1, wherein the electrical conductor is an insulated copper wire.

9. The transmitter and receiver of claim 1, wherein the electrical conductor is a conductive trace on a flexible printed circuit board.

10. A transmitter and a receiver for use in a near-field magnetic induction communication system, the transmitter comprising:
  a first ferrite material covering at least a portion of a first battery, the first battery being used for powering at least a portion of the transmitter;
  a transmitter antenna comprising an electrical conductor disposed around the first battery and the first ferrite material in a predetermined number of loops; and
  a transmitter tuning circuit comprising a signal source, first and second amplifiers, a first variable tuning capacitor and a first variable resistance, the first and second amplifiers each having an input coupled to the signal source, an output of the first amplifier coupled to a first end of the electrical conductor and an output of the second amplifier coupled to a second end of the electrical conductor, the first variable tuning capacitor and the first variable resistance coupled together in parallel between the first and second ends of the electrical conductor, the first variable tuning capacitor for maintaining the looped electrical conductor in resonance, and the first variable resistance for maintaining a bandwidth of the looped electrical conductor, and
the receiver comprising:
  a second ferrite material covering at least a portion of a second battery, the second battery being used for powering at least a portion of the receiver;
  a receiver antenna comprising an electrical conductor disposed around the second battery and the second ferrite material in a predetermined number of loops; and
  a receiver tuning circuit comprising a third amplifier, a second variable tuning capacitor, and a second variable resistance, the second variable tuning capacitor and the second variable resistance coupled together in parallel between first and second ends of the electrical conductor of the receiver antenna, the third amplifier having first and second inputs coupled to the first and second ends, respectively, of the electrical conductor of the receiver antenna,
wherein neither of the first end or the second end of the electrical conductors of the transmitter and receiver antennas are connected to a reference voltage, and wherein during operation the looped electrical conductor of the transmitter is oriented so that an open end of the looped electrical conductor is directed toward an open end of a looped electrical conductor of the receiver and along the same axis.

11. The transmitter and receiver of claim 10, wherein the first and second ferrite material each comprises a ferrite sheet.

12. The transmitter and receiver of claim 10, wherein the communication system provides wireless signal transmission between the earbuds of a pair of earbuds.

13. The transmitter and receiver of claim 10, wherein the first and second ferrite material is applied as a coating comprising ferrite particles in suspension.

14. The transmitter and receiver of claim 11, wherein the ferrite sheet includes an adhesive on one side for adhering to the non-magnetic metallic core.

15. The transmitter and receiver of claim 10, wherein a carrier frequency for communication system is 10.6 Mega Hertz (MHz).

16. A transmitter and a receiver for use in a battery powered near-field magnetic induction wireless communication system, the transmitter comprising:
  a first magnetic material covering at least a portion of a first battery, the first battery being used for powering at least a portion of the transmitter;
  a transmitter antenna comprising an insulated electrical conductor disposed around the battery and the first magnetic material in a predetermined number of loops; and
  a transmitter tuning circuit comprising a signal source, first and second amplifiers, a first variable tuning capacitor and a first variable resistance, the first and second amplifiers each having an input coupled to the signal source, an output of the first amplifier coupled to a first end of the electrical conductor and an output of the second amplifier coupled to a second end of the electrical conductor, the first variable tuning capacitor and the first variable resistance coupled together in parallel between the first and second ends of the electrical conductor, the first variable tuning capacitor for maintaining the looped electrical conductor in resonance, and the first variable resistance for maintaining a bandwidth of the looped electrical conductor, and
the receiver comprising:
  a second magnetic material covering at least a portion of a second battery, the second battery being used for powering at least a portion of the receiver; and
  a receiver antenna comprising an insulated electrical conductor disposed around the second battery and the second magnetic material in a predetermined number of loops;
  a receiver tuning circuit comprising a third amplifier, a second variable tuning capacitor, and a second variable resistance, the second variable tuning capacitor and the second variable resistance coupled together in parallel between first and second ends of the insulated electrical conductor of the receiver antenna, the third amplifier having first and second inputs coupled to the first and second ends, respectively, of the insulated electrical conductor of the receiver antenna,
wherein neither of the first end or the second end of the insulated electrical conductors of the transmitter and receiver antennas are connected to a reference voltage, and wherein during operation the insulated electrical conductor of the transmitter is oriented so that an open end of the insulated electrical conductor is directed toward an open end of a insulated electrical conductor of the receiver and along the same axis.

17. The transmitter and receiver of claim 16, wherein the first and second batteries are cylindrical shaped having a curved side and two ends, the magnetic material only covering the side of the battery.

18. The transmitter and receiver of claim 16, wherein the first and second magnetic material comprises a ferrite material.

19. The transmitter and receiver of claim 16, wherein the communication system provides wireless signal transmission between the earbuds of a pair of earbuds.

20. The transmitter and receiver of claim 16, wherein a carrier frequency for the wireless signal transmission is 10.6 Mega Hertz (MHz).

\* \* \* \* \*